R. A. MAYER.
CANE HARVESTING MACHINE.
APPLICATION FILED MAR. 31, 1919.

1,392,258.

Patented Sept. 27, 1921.

R. A. MAYER.
CANE HARVESTING MACHINE.
APPLICATION FILED MAR. 31, 1919.

1,392,258. Patented Sept. 27, 1921.
7 SHEETS—SHEET 6.

Inventor
R. A. Mayer
By Victor J. Evans
Attorney

Witnesses

R. A. MAYER.
CANE HARVESTING MACHINE.
APPLICATION FILED MAR. 31, 1919.

1,392,258.

Patented Sept. 27, 1921.
7 SHEETS—SHEET 7.

Witnesses
J. L. Wright
W. Jagger

Inventor
R. A. Mayer
By Victor J. Evans
Attorney

UNITED STATES PATENT OFFICE.

RUDOLPH A. MAYER, OF PECAN ISLAND, LOUISIANA.

CANE-HARVESTING MACHINE.

1,392,258.  Specification of Letters Patent.  Patented Sept. 27, 1921.

Application filed March 31, 1919. Serial No. 286,543.

*To all whom it may concern:*

Be it known that I, RUDOLPH A. MAYER, a citizen of the United States, residing at Pecan Island, in the parish of Vermilion and State of Louisiana, have invented new and useful Improvements in Cane-Harvesting Machines, of which the following is a specification.

This invention relates to sugar cane harvesters of that general class or type which are used for cutting the cane a short distance above the ground and for removing the tops, at a single operation.

One object of the invention is to produce an organized machine of simple and improved construction whereby the canes will be gathered, the incoming canes passing in engagement with a conveying device whereby the canes are carried in an upright position in engagement with cutting apparatus whereby the tops will be detached; additional cutting apparatus being provided, if desired, whereby short lengths of cane may be detached below the tops to serve as settings.

A further object of the invention is to produce a simple and improved construction whereby canes of different lengths will be handled in such a fashion that only the tops will be detached without wasting any valuable portion of the cane.

Further objects of the invention are to simplify and improve the parts entering into the construction of the machine and also to provide a construction whereby adjustment of the parts in various ways may be had, when desired.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Fig. 12 is a transverse sectional view taken on the line 12—12 in Fig. 1, the strippers being omitted.

Corresponding parts in the several figures are denoted by like characters of reference.

Figure 3:
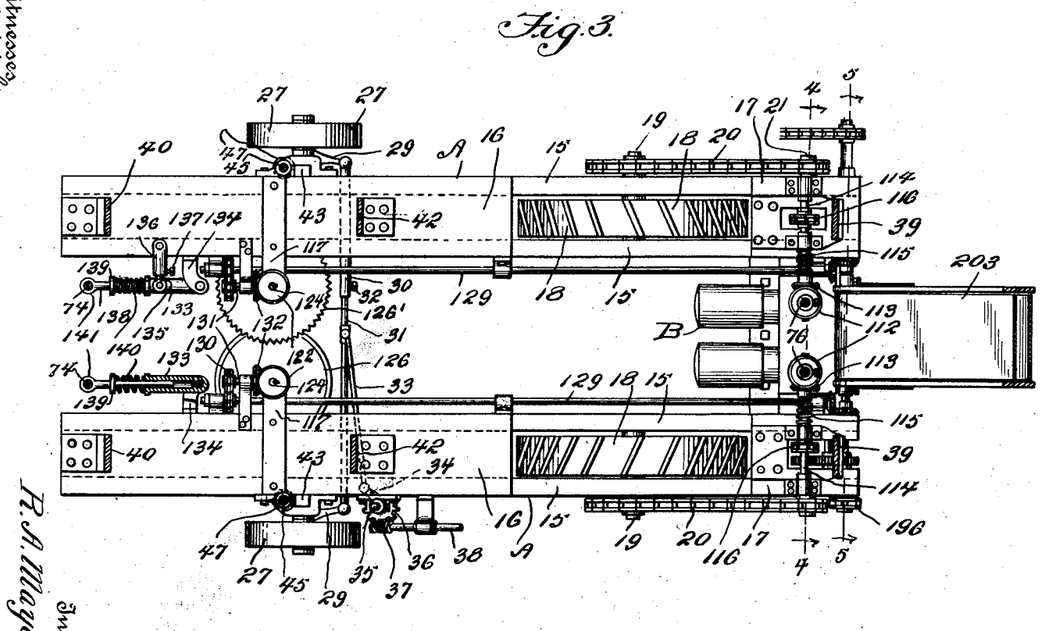
Fig. 3 is a horizontal sectional view taken on the line 3—3 in Fig. 1.

In a machine of this class it is essential that the frame structure be composed of two side members which are connected together and spaced apart in such a manner as to permit the cane to pass through the machine in a substantially standing or upright position without interference by the frame members or the mechanism mounted thereon. In the present instance it is furthermore desired to so connect the side members of the frame that the distance or space therebetween may be varied. With this end in view the frame of the improved machine is composed of side members A—A, each of said side members comprising two beams or sills 15 which are permanently connected together and spaced apart in any convenient manner. As best seen in Fig. 3 the sills 15 of each side member have been shown as being connected together by plates 16, 17, said plates being bolted, riveted or otherwise secured on the sills which latter have been shown as being composed of structural iron or steel. The front and rear plates 16, 17, have been suitably spaced apart to make room for the rear wheels 18 which are mounted on the axles 19, the wheels being driven by transmission chains 20 from a motor driven shaft 21. The means for transmitting power from the motor driven shaft to the driving wheels includes clutches of well known construction or other well known means whereby the motion may be interrupted and regulated at will. The axles 19 are supported in pillow blocks 22, best seen in Fig. 1.

Figure 4:
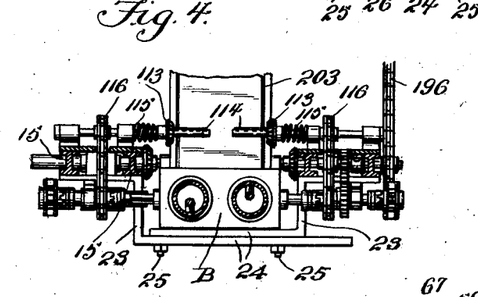
Fig. 4 is a detail sectional view taken on the line 4—4 in Fig. 3.
Figure 5:
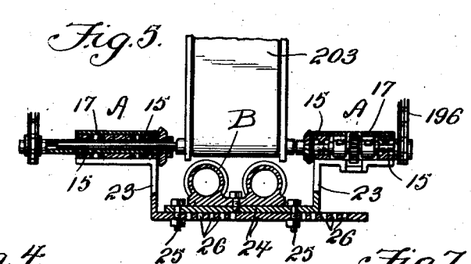
Fig. 5 is a sectional detail view taken on the line 5—5 in Fig. 3.

Each of the side members A carries an angular bracket 23, Figs. 4 and 5, each of said brackets including a horizontal plate 24, said plates 24 being arranged in overlapping relation, and said plates being firmly connected together by means of bolts 25 for the passage of which one of said brackets is provided with numerous apertures 26, thus enabling the said plates to be secured together at various adjustments, thus enabling the side members A—A to be variously spaced apart. The side frame members A as well as the brackets 23 including the horizontal plates 24 are to be of strong and massive construction; sufficiently so to enable them to support the superposed machinery without danger of sagging or breaking, it being remembered that the brackets 23 constitute the principal means for connecting together and spacing apart the side members of the frame structure. The motor B from which power is derived for driving the machine and its moving parts is mounted on the uppermost plate 24; said motor may be of any desired type; usually an internal combustion motor of approved construction.

The forward ends of the side members of the frame structure are supported on steering wheels 27, said wheels being mounted on steering knuckles 28 having arms 29 which are connected together by a steering rod which is of telescopic construction, said rod including a tubular member 30 in which a rod 31 telescopes, said rod being capable of being secured by a set screw 32. The steering rod is thus capable of being adjusted with respect to the length thereof when the side members of the frame are variously spaced, as hereinbefore described. The steering rod is connected by a rod or link 33 with an arm 34 that extends radially from a shaft 35 having a worm gear 36 meshing with a worm 37 on a steering rod 38 by the rotation of which the machine may be steered.

Figure 1:
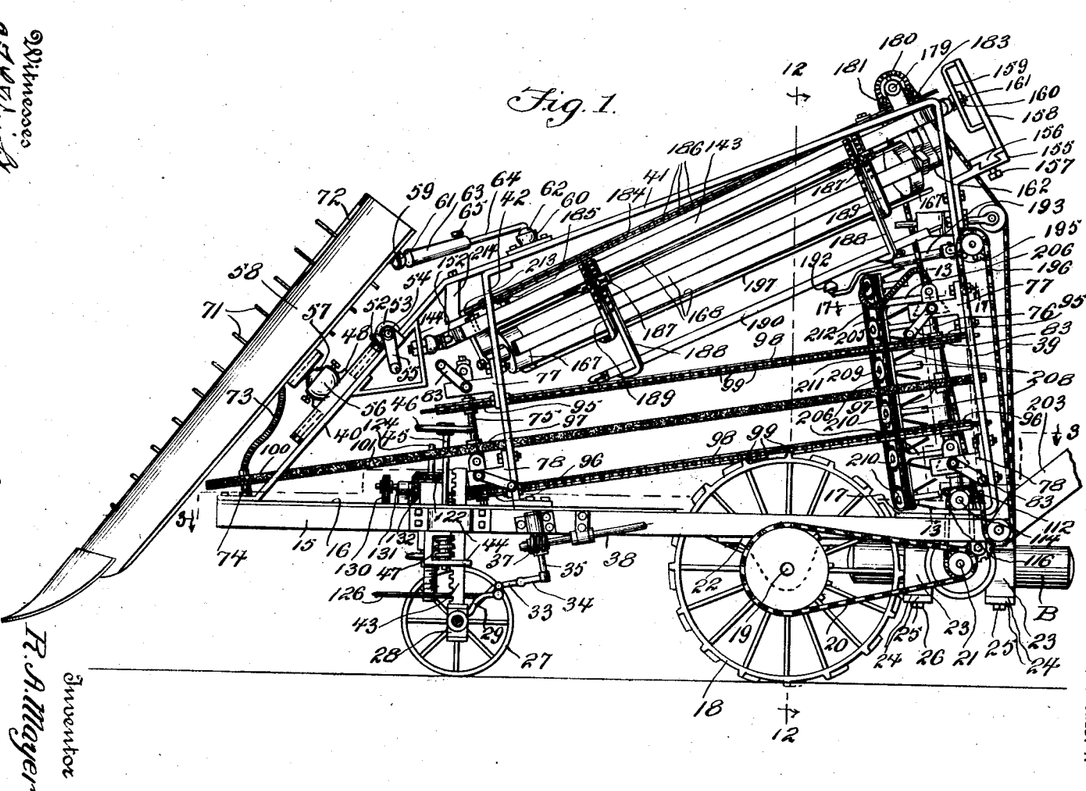
Figure 1 is a side elevation of a machine constructed in accordance with the invention.

The superstructure of the frame includes uprights 39, 40 rising from the rear and front ends respectively of the frame and tilted respectively in a forward and a rearward direction, as best seen in Fig. 1. The rear uprights are considerably higher than the front uprights and the upper ends of said rear and front uprights are connected together by downwardly and forwardly inclined top members 41, the latter being reinforced by braces 42 whereby said top members are connected with the side members of the frame.

For the purpose of enabling the front end of the frame structure to be raised or lowered with respect to the ground the knuckles on which the steering wheels 27 are supported for rotation are mounted on and carried by rack bars one of which is clearly seen at 43 in Fig. 1, said rack bar being arranged for vertical slidable movement in a keeper 44 secured on one of the side members of the frame structure. A vertical shaft 45 having a hand wheel 46 also carries a worm 47 that meshes with the rack bar 43 which latter, by rotation of the shaft 45, may be raised or lowered, thereby effecting the desired vertical adjustment of the front end of the frame structure.

Figures 6, 8, 10, 11:
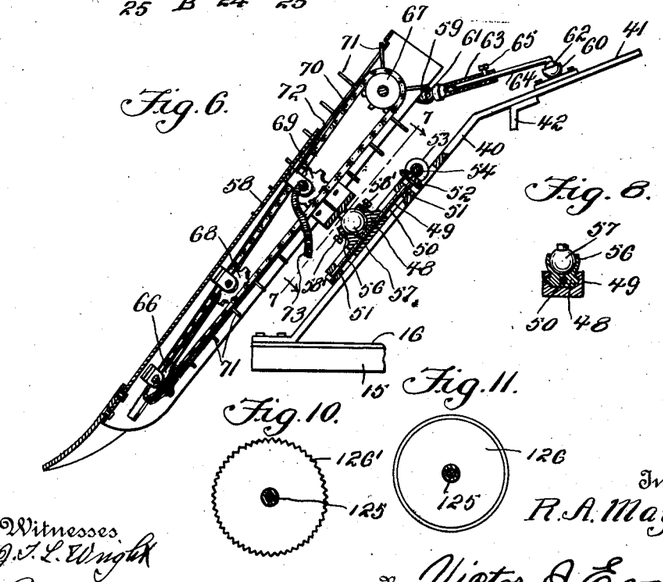
Fig. 6 is a sectional detail view taken through one of the gathering arms.
Fig. 8 is a sectional detail view taken on the line 8—8 in Fig. 7.
Figs. 10 and 11 are detail plan views having different forms of the rotary cutter.
Figure 7:
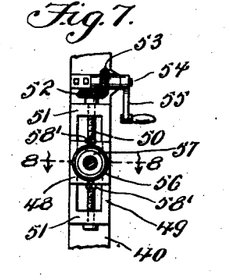
Fig. 7 is a sectional detail view taken on the line 7—7 in Fig. 6.

Mounted on the inclined frame member 40 of the superstructure at each side of the frame is a slide 48 for which suitable guides 49 are provided, see Figs. 6, 7 and 8. The slide is adjustable lengthwise of the frame member 40 by means of a screw threaded rod 50 having threaded engagement with the slide, said rod being supported for rotation in bearings 51, and said rod is connected by intermeshing bevel gears 52, 53 with a shaft 54 having a crank or handle 55 by the rotation of which adjustment of the slide may be effected as set forth lengthwise of the frame member 40. The slide 48 has a socket 56 for the reception of a ball 57 carried by a housing or casing 58 which constitutes one of the gathering arms of the machine there being one such housing at each side of the frame structure. For the purpose of securing the ball 57 in adjusted position in the socket 56 the latter is provided with set screws 58' which may be tightened against the ball at diametrically opposite sides thereof. It will be seen that by this construction the gathering arm is not only capable of being adjusted lengthwise with respect to the inclined frame member 40, such adjustment being in effect a vertical as well as a longitudinal adjustment owing to the inclined position of the frame member 40, but having been thus adjusted it is furthermore capable of being universally adjusted in a vertical as well as in a horizontal plane owing to the ball and socket connection of the housing 58 with the slide 48. As it is not desirable to depend entirely on the set screws 58' for retaining the gathering arm in adjusted position with respect to the socket member 56 there is provided an additional holding means comprising sockets 59, 60 mounted respectively on the housing of the gathering arm and on the frame member 41 at each side of the machine, said sockets receiving balls 61, 62 associated with telescopic rods 63, 64, the rod 63 being of tubular formation permitting the rod 64 to telescope therein and to be retained in adjusted position by a set screw 65. It is obvious that this holding or retaining device will adapt itself to any position adjacent to the gathering arm at each side of the frame structure, said gathering arms being thereby retained with sufficient stability to enable them to function in the customary manner for the gathering of incoming stalks or canes, especially when the latter are in any way deflected from an upright position.

Supported by the means shown for rotation within each of the housings or casings 58 of the respective gathering arms, and near the lower and upper ends thereof respectively, are sprocket wheels 66, 67, said sprocket wheels being arranged in planes substantially at right angles to one another. Other sprocket wheels 68, 69 are supported by the means shown in intermediate positions between the sprocket wheels 66, 67 so that a chain 70 trained over the several sprocket wheels will have one end thereof disposed in a plane substantially at right angles to the other end. The links of the chain, or some of said links, are provided with outwardly extending pins or prongs 71 for the passage of which the housings are provided with slots 72 of spiral formation. The lower rear parts of the housings may be open, as best seen in Fig. 6, so as not to interfere with the passage of the pins. When the machine is in operation and the chains 70 are are driven in the proper direction, the pins or prongs 71 will engage especially such stalks or canes as have become deflected from an upright position and will tend to lift the same so that they will pass properly in engagement with the gathering and conveying device of the machine which will be presently more fully described. The chains may be driven by flexible shafting 73 which has been shown as being applied preferably to the shafts carrying the sprocket wheels 69 but which may be equally well applied to other sprockets over which chains 70 are trained, the flexible shafts 73 deriving motion from shafts 74 with which they are operatively connected and of which further mention will hereinafter be made.

It will be seen that the pins or prongs 71 of the chains 70, after serving the purpose of lifting the tilted or falling stalks or of canes and carrying the same rearwardly between the sides of the frame structure, will automatically disengage themselves from the canes or stalks, such disengagement being due to the spiral course taken by the chains 70 and to the spiral formation of the slots 72 through which the pins or prongs are guided.

The forwardly tilted frame members 39 of the superstructure are disposed substantially in parallel relation to the brace members 42 and said frame members and braces are utilized as supports for shafts over which the endless chains constituting the principal conveying device of the machine are trained. The front shafts which are supported on the brace members 42 are designated by 75 and the rear shafts which are supported on the brace members 39 are designated by 76. The front and rear shafts are supported in such a manner as to be adjustable in various directions and the construction being identical, the description of one will apply to all.

Figure 13:
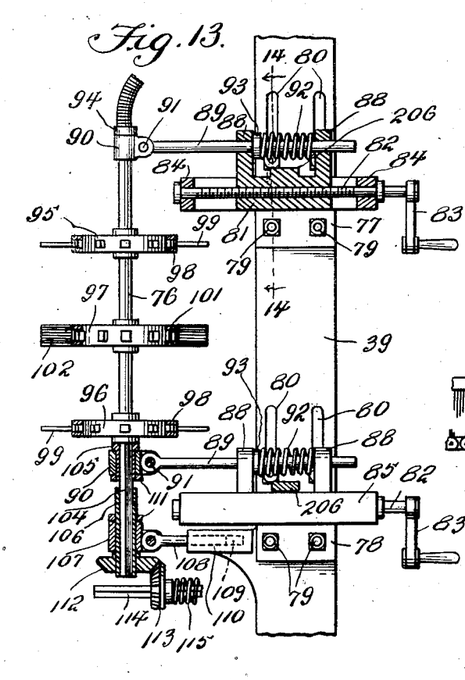
Fig. 13 is a sectional detail view taken on the line 13—13 in Fig. 1.

Referring then to Fig. 13 which shows one of the frame members 39 and one of the shafts 76, the said frame member is equipped with top and bottom slides 77, 78 each of which is vertically adjustable by means of fastening members such as bolts 79 engaging slots 80 in the frame member 39. Each of the slides 77, 78 carries a secondary slide 81 which is transversely adjustable by means of a screw threaded rod 82 having a crank or handle 83, said screw threaded rod being journaled for rotation in arms 84 connected with and forming part of the respective slides 77, 78. The arms 84 of each of the primary slides are connected by a cross bar 85 and said cross bars and slides are provided with guide grooves 86 engaged by tongues 87 formed on the secondary slides. The secondary slides are provided with upwardly extending arms 88 in which rods 89 are slidably supported, said rods having bearing members 90 pivotally connected therewith by pins or pivot members 91. The rods 89 are actuated in an inward direction with respect to the frame structure of the machine by means of springs 92 abutting against collars 93 on said rods.

The shafts 75 and 76 which are supported for rotation in the respective bearing members 90 may be adjusted vertically and laterally with respect to the frame members 42 and 39 respectively, said shafts being provided with collars 94 resting on the top bearing members 90. The upper and lower ends of the respective shafts are also free to move outwardly against the tension of the respective springs 92. Each of the shafts 75 and 76 is equipped with top and bottom sprocket wheels 95, 96 and with intermediate sprocket wheels 97. Conveyer chains 98 are trained over the top and bottom sprocket wheels 95, 96 on the shafts at each side of the frame structure, the links of said chains or some of said links being provided with outwardly extending prongs 99. Owing to the flexible mounting of the shafts, the conveyer chains at the two sides of the frame structure will not only be spaced apart, but said chains will be resiliently forced in the direction of each other so that stalks or canes carried through the machine by the instrumentality of said chains will be securely clamped and held in an upright position and will be also held against displacement lengthwise of the chains owing to the prongs with which the chain links are provided.

Figure 15:
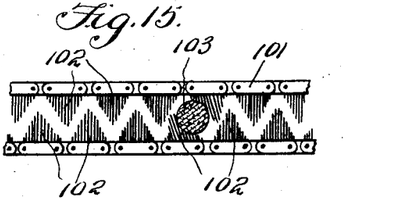
Fig. 15 is a detail plan view of portions of the coöperating chains constituting the cane conveyer.
Figures 16, 18:
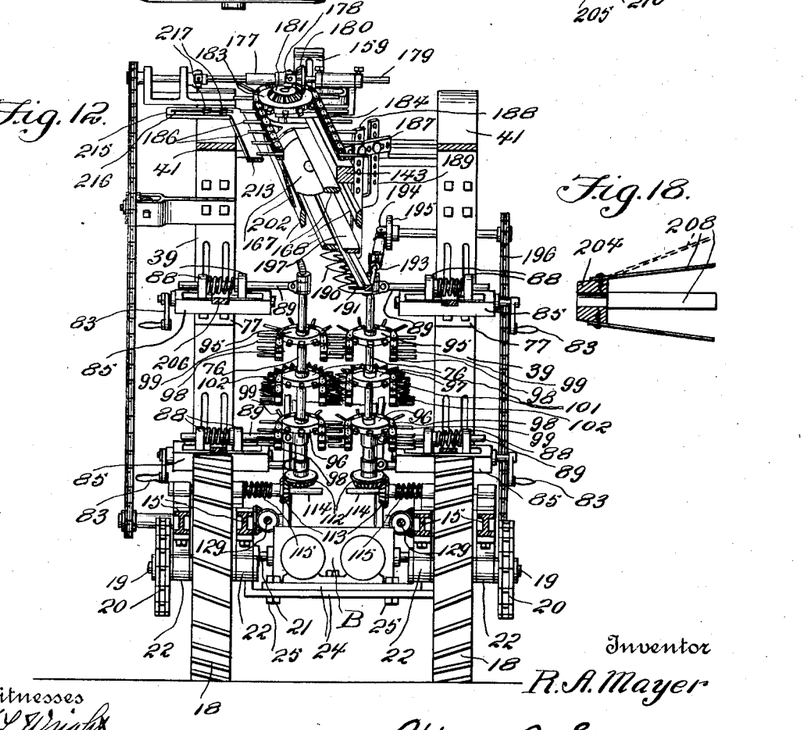
Fig. 16 is a detail plan view showing portions of two of the auxiliary conveyer chains.
Fig. 18 is a sectional detail view, enlarged, of one of the strippers.
Figure 16:
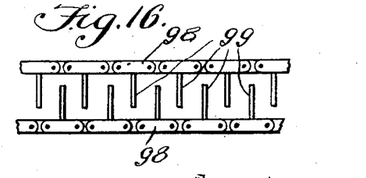

The hereinbefore mentioned shafts 74 at the front ends of the side members of the frace structure are equipped with sprocket wheels 100 that serve to support the forward ends of conveyer chains 101, said conveyer chains being also trained over the intermediate sprockets 97 on the respective shafts 75 and 76. It will thus be seen that the intermediate conveyer chains 101 extend materially in a forward direction with respect to the chains 98 that are trained over the top and bottom sprockets 95, 96, on the respective shafts 75 and 76. Conveyer chains 101 are of special construction, as best seen in Fig. 15, the links of said chains being provided with bristles 102 of wire or other sufficiently stiff and flexible material, said bristles being trimmed to present triangular appearance, clearly illustrated in Fig. 15, so that the bristles associated with the links on the inner stretches of the respective chains 101 will be disposed in staggered and interengaging relation, this construction having been found extremely suitable and useful for taking a firm hold on the incoming stalks or canes one of which may be seen in cross section at 103.

Each of the rearward shafts 76 has a downward extension 104 of non-circular cross section said extension being in engagement with a bearing sleeve or bushing 105 supported in the lowermost bearing member 90. An additional support for the non-circular extension 104 is afforded by a bearing sleeve or bushing 106 supported for rotation in a bearing member 107 which is pivotally connected with a rod 108 slidable in a socket 109 in an arm 110 extending from the frame member 39. The bearing sleeves or bushings 105, 106 are equipped with collars 111 whereby they are properly retained in their respective bearing members and the sleeve or bushing 106 carries a bevel gear 112 meshing with a bevel pinion 113 on a countershaft 114, said pinion 113 being held in engagement with the bevel gear 112 by the action of a spring 115 on the countershaft 114 with which the pinion 113 is slidably connected for rotation therewith. The bevel gears will thus remain in mesh irrespective of the positions assumed by the shafts 76 and their non-circular extensions. The countershaft 114 at each side of the machine is driven by power transmitted from the motor-driven shaft 21 by means including a transmission chain 116 or in any suitable and convenient well known manner. It is obvious that the shafts 76 being thus positively driven, motion will be transmitted to the conveyer chains 98 and 101. It is also obvious that when the vertical adjustment of the shafts 76 is effected, the non-circular extensions of said shafts will remain in engagement with the sleeves or bushings 105, 106 which latter are positively driven through the medium of the interengaging bevel gears 112, 113.

Figure 9:
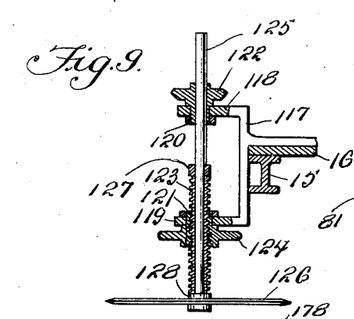
Fig. 9 is a sectional detail view taken through one of the rotary cutters that are used for severing the cane from the ground, and related parts.

Each side member of the frame of the machine is provided with a bracket 117, Figs. 3 and 9, having upper and lower arms 118, 119 in which hubs or bushings 120, 121 are supported for rotation. The bushing 120 carries a bevel gear 122. The bushing 121 is internally threaded for the passage of an externally threaded sleeve 123. The bushing 121 is also provided with a hand wheel 124 whereby the bushing may be rotated. Extending through the bevel gear 122, bushing 120 and sleeve 123 is a non-circular shaft 125 carrying at its lower end a circular cutter 126. Said shaft also is provided with a stop collar 127 which engages the upper end of the sleeve 123, the lower end of said sleeve being engaged by the hub 128 of the cutter 126. It follows that by rotation of the hand wheel 124 the sleeve 123 together with the cutter carrying shaft may be raised or lowered without disconnecting it from the bevel gear 122 by means of which the cutter is driven from the source of power. The cutter 126 at one side of the machine is to be overlapped by the cutter at the other side of the machine so that together they will exercise a shearing action on the incoming stalks or canes which will thus be severed the desired distance above the ground by the cutters having been previously adjusted so as to cut the stalks or canes as close to the ground as may be desired. In Figs. 9 and 11 a circular cutter having a plain cutting edge has been shown. In Fig. 10 a circular cutter having a serrated or saw-toothed edge has been illustrated, and it is to be understood that either form of cutter may be utilized and also that the shape of the teeth on the cutter shown in Fig. 10 and specially designated by 126' may be varied, and also that a plain and a saw toothed cutter may be used in connection with each other when so desired. Each of the cutters is driven through the medium of a shaft 129 which is driven from the motor by suitable transmission means which it is not necessary to describe in detail. The forward end of each shaft 129 transmits motion through a chain 130 to a shaft 131 having a bevel pinion 132 meshing with the bevel pinion 122 on the cutter carrying shaft 125.

Special bearings or supports are provided for the shafts 74 carrying the sprocket wheels 100 over which the forward ends of the special conveyer chains 101 are trained. Each of said bearings comprises a tubular socket member 133, Fig. 3, pivoted on an arm or bracket 134 and having connected therewith a pivoted arm 135 which engages a socket member 136 pivoted on the frame of the machine and having a set screw 137 whereby the arm 135 may be secured at various adjustments. Engaging the socket member 133 is a rod 138 having a collar 139 between which and the forward end of the socket member 133 a spring 140 is interposed whereby the rod 138 is forcibly projected in a forward direction. The rod 138 is provided at its forward end with a bearing 141 in which the shaft 74 is supported for rotation. The socket 133, rod 138 and spring 140 may be regarded as constituting a tightening device whereby the sprocket wheel 100 carried by the shaft 74 is constantly forced in a forward direction so as to maintain the chain 101 always under proper tension. By proper adjustment of the arm 135 in the pivoted socket member 136 the sprocket carrying shaft 74 may be adjusted laterally and it will be readily seen that by proper adjustment of the parts the forward ends of the inner stretches of the respective chains 101 may be spaced variously apart and may be adjusted so as to form a V-shaped gap or mouth, indicated clearly at 142 in Fig. 2 of the drawings, which will greatly facilitate the reception between the inner stretches of the conveyer chains 101 of the incoming stalks or canes. This is regarded as an important feature of the invention and it is to be understood that while a simple and preferred construction has been shown whereby the desired adjustment of the chains may be effected and the chains still be held under proper tension, no limitation is made to the precise construction herein shown.

The front member 40 of the superstructure of the frame at one side of the machine and the upright 39 of the superstructure at at the other side of the machine are utilized to support an obliquely disposed upwardly and rearwardly tilted frame bar 143 which, in turn, is utilized to support the reel and the cutting apparatus whereby the stalks or canes are topped and whereby, if desired, short pieces are cut from the canes below the tops to be utilized as settings for a subsequent crop. It is essential that the front and rear ends of the frame bar 143 be mounted or supported in such a manner as to be independently adjustable, vertically as well as laterally, and with this end in view the supporting means which will now be more particularly described have been adopted.

Figures 19, 20, 22:
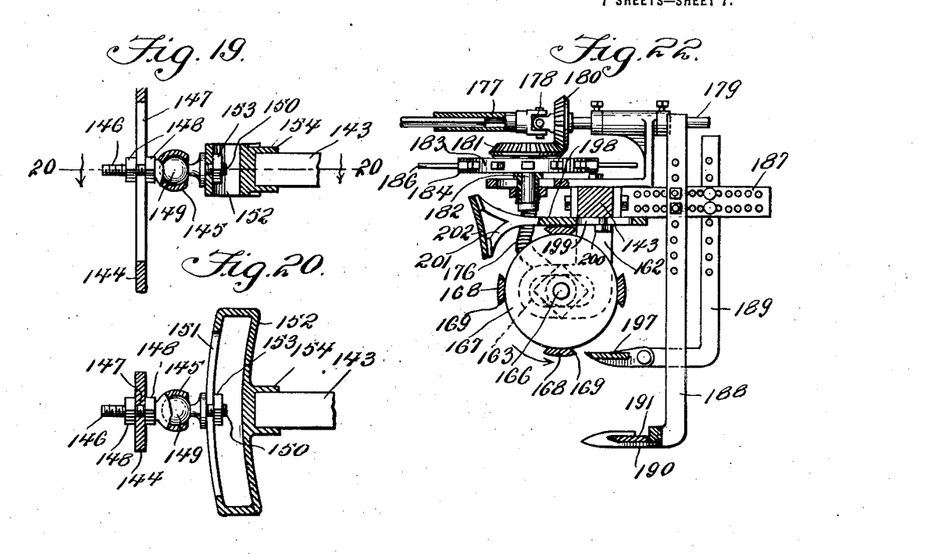
Fig. 19 is a sectional detail view of one of the end supports for the adjustable frame bar.
Fig. 20 is a sectional view taken on the line 20—20 in Fig. 19.
Fig. 22 is a sectional detail view taken on the line 22—22 in Fig. 21.

The frame member 40 carries a bracket 144 a portion of which has been clearly shown in Figs. 19 and 20. 145 is a socket having a screw threaded stem 146 which is adjustable in a slot 147 in the bracket member 144, said stem being provided with clamped nuts 148 whereby the socket may be secured at the desired adjustment. Mounted in the socket 145 is a ball 149 having a screw threaded stem 150 that engages a slot 151 in one side of an arcuate frame 152, the stem 150 being provided with a nut 153 which may be tightened to secure the parts at various adjustments. The other side of the frame 152 has a socket 154 of square or rectangular shape to receive the front end of the frame bar 143.

The frame member 39 diagonally opposite to the frame member 40 carrying the bracket 144 is provided with a rearwardly extending arm 155 on which is supported a transversely movable slide 156 which may be secured in adjusted position by means of a set screw 157. The slide 156 has an upwardly extending arm 158 carrying a slotted bracket 159 with which the rearward end of the frame bar 143 is adjustably connected by means of a nut 160 that engages a screw threaded stem 161 with which the frame bar is provided.

Figure 21:
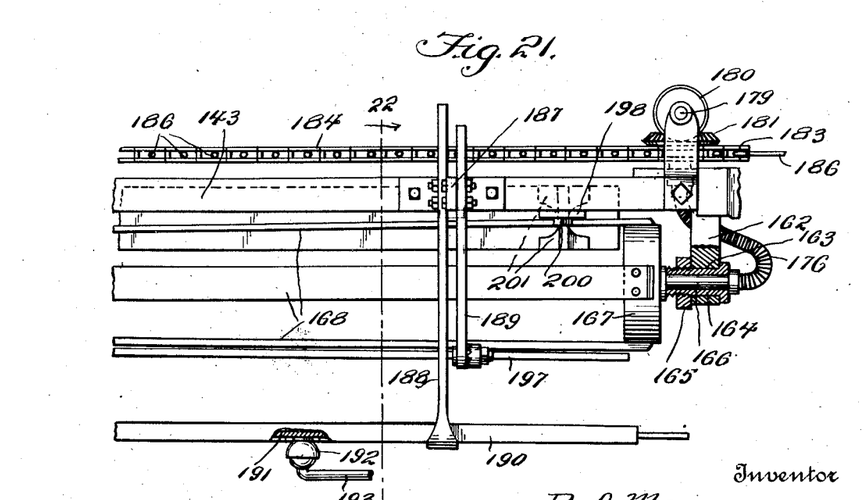
Fig. 21 is a detail view partly in elevation and partly in section showing a portion of the reel and related parts.
Figure 23:
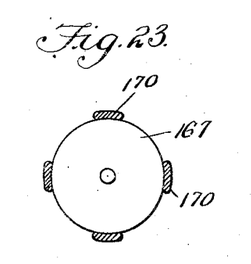
Figs. 23, 24 and 25 are sectional detail views showing modified forms of the reel.
Figure 24:
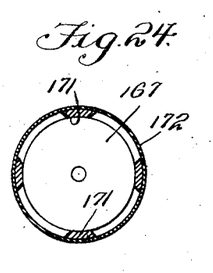
Figure 25:
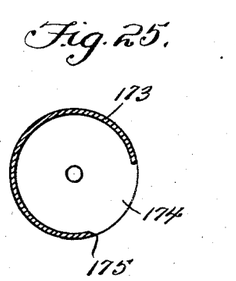

The frame bar 143 is provided with L-shaped brackets 162, one of which appears in Figs. 21 and 22, each of said brackets having a slot 163 in which a bearing sleeve 164 is adjustably secured by means of a clamping nut 165. The bearings 164 serve to support a shaft 166 carrying a reel which as shown in Fig. 22 may include at each end a head 167, said heads being connected together and spaced apart by longitudinal bars 168, said bars having been shown in Fig. 22 as being provided with cutting edges 169. In Fig. 23 reel bars here designated by 170 have been shown which are spaced apart and not provided with cutting edges. In Fig. 24 the reel bars here designated by 171 are surrounded by a cylindrical cover 172 of sheet metal or other suitable material. Under the construction shown in Fig. 25 the reel bars are omitted and the reel has been shown as being composed of a cylinder 173 made of metal and having a longitudinal slot or opening 174 at one edge of which a cutting edge 175 is provided. The reel carrying shaft in each instance is intended to be driven by means of a flexible shaft, best seen in Fig. 21 at 176, said flexible shaft being driven by power derived from the motor through the medium of transmission means which it is not necessary to describe in detail but which includes a telescopic shaft 177 connected by a universal joint 178 with a shaft 179 from which motion is transmitted by intermeshing bevel gears 180, 181 to the shaft 182 with which the flexible shaft is connected. The driven shaft 182 also carries a sprocket wheel 183 supporting an endless chain 184 which is also trained over an idle sprocket 185 supported near the forward end of the frame bar 143. The chain 184 the links of which are provided with outwardly extending fingers 186 will thus be supported above the reel, said chain being adjustable with the frame bar 143 on which the means for supporting and driving said chain are mounted.

Figure 2:
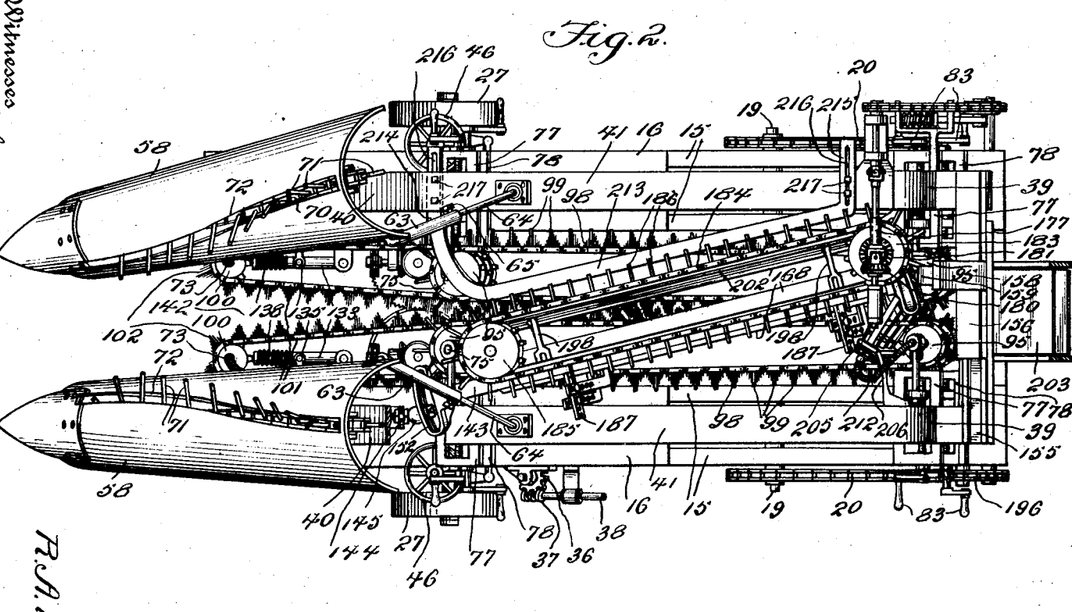
Fig. 2 is a top plan view.

The frame bar 143, as best seen in Figs. 2 and 22, is provided with laterally extending brackets 187 with which arms 188 and 189 are adjustably and detachably connected. The arms 188 support at their lower ends a finger bar 190 of conventional construction and with which coöperates a sickle bar 191, said sickle bar being connected by a ball and socket joint 192 with one end of a pitman 193 the other end of which is connected with a wrist pin 194 on a crank disk 195 which may be driven by means including a chain 196 by power derived from the motor. The arms 189 are utilized to support a stationary knife or cutting member 197 which, as seen in Fig. 22, is adapted to coöperate with the cutting edges 169 of the reel bars 168. One of the cutting devices may be omitted when desired as will be the case if the canes are only to be topped without detaching short pieces of settings therefrom.

It is obvious that the cutter carrying arms 188 and 189 are to be disposed adjacent to the upgoing side of the reel. Adjustably connected with the frame bar 143 and extending above the reel adjacent to the downgoing side thereof are a pair of arms one of which is seen at 198 in Figs. 21 and 22, each of said arms having a slot 199 engaged by a set screw 200 whereby the arm may be adjustably secured in position. Each of the arms is bifurcated at its outer end as shown at 201, the limbs thereby produced serving to support a shield or deflector 202 which extends lengthwise of the reel in proximity to the upper portion of the downgoing side thereof. This shield serves to guide the tops of the canes which are directly engaged by the prongs 186 of the chain 184, the latter serving in conjunction with the conveyer chains 98 and 101 to convey the canes through the machine.

A suitably constructed and driven elevator 203 is connected with the rearward part of the frame of the machine to receive the canes that have been topped and otherwise treated when said canes are discharged, the elevator serving to convey said canes to a receptacle such as the box of a wagon trailing the machine.

Figure 14:
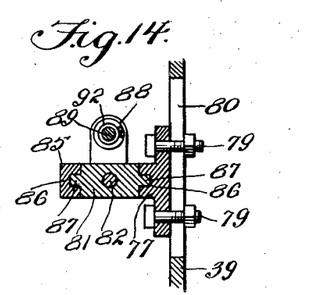
Fig. 14 is a sectional detail view taken on the line 14—14 in Fig. 13.
Figure 17:
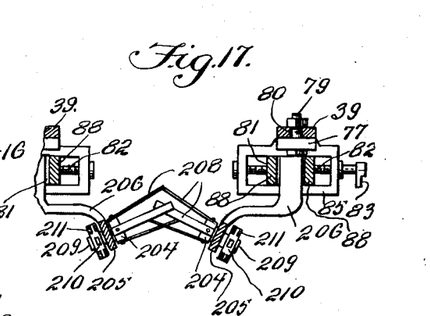
Fig. 17 is a sectional detail view taken on the line 17—17 in Fig. 1, showing a portion of the stripping mechanism.

For the purpose of stripping the leaves from the stalks or canes, stripping devices have been provided which may be arranged at any convenient point but which have been shown as being located near the rearward part of the frame structure. The stripping devices comprise heads 204 which are mounted for rotation in obliquely disposed frame bars 205 carried by arms 206 which are integral with the sides 81 as seen in Figs. 13 and 14. The heads 204 are equipped with resilient fingers 208 which extend obliquely in the direction of each other so as to overlap, as clearly seen in Fig. 17, the oblique disposition of the heads and the fingers serving to greatly facilitate the passage of the stalks therebetween and also to insure that the leaves will be detached from all sides of the stalks. The rotary heads 204 are provided with spindles 209 on which sprocket wheels 210 are mounted. Chains 211 are trained over the sprocket wheels 210 so that the latter will all be driven in unison, thereby driving the strippers, when one of said sprocket wheels is driven by means of a flexible shaft 212 which latter may receive motion from any convenient driven part of the machine, it being particularly understood that the manner of driving the moving parts of this machine may be greatly varied, driving means having mainly been conventionally shown in the accompanying drawings, but detailed description thereof having been purposely omitted.

Supported by and connected with the superstructure of the frame in substantially parallel relation to the axis of the reel carrying shaft is a guide bar 213 having arms 214, 215 at its front and rear ends, each of said arms being provided with a slot 216 for the passage of fastening members such as bolts or screws 217 whereby the guide bar is adjustably mounted on the frame structure. It is intended that this guide bar shall be supported in an approximately parallel relation with the shield or deflector 202 and at no great distance from the latter.

In the operation of this machine when it passes over the field a row of stalks or canes will be engaged by the gathering arms and by prongs of the spirally disposed gathering chains housed within said arms and the prongs of which project through the spiral slots 72 therein. These devices will serve to lift fallen and tilted stalks or canes and to guide them into engagement with the conveyer chains 101 the forward end portions of which have been spaced apart by the means herein described to produce a V-shaped gap or mouth 142. The stalks will be presently engaged between the inner stretches of the conveyer chains 98 which coöperate with the chains 101 to carry the stalks in a slightly tilted position rearwardly and upwardly between the side members of the frame structure. The frame bar 143 and the reel carried thereby are disposed obliquely across the machine as heretofore clearly described and said frame bar and reel are also tilted upwardly and rearwardly to a material extent. These features are of great and special importance. These members must be obliquely disposed in order that the incoming stalks may be placed in engagement with the downgoing side of the reel. At the same time the deflector 202, the guide bar 213 and the endless conveyer chain 184 are provided in order to guide the tops and to prevent said tops from being prematurely subjected to the action of the reel. The particular construction and arrangement of these parts of the machine has been resorted to in order that the tops of the stalks may not be subjected to the action of the cutting device regardless of the length of the stalks, it being desired to remove only the tops, and possibly short pieces for settings, without wasting any of the useful portion of the cane. By the construction as herein described it will be seen that the tops of the very short stalks will first pass out of engagement with the deflector 202, such tops passing now in engagement with the reel. If the reel is constructed as seen in Figs. 22 or 23, the tops will pass between proximate reel bars and will be thereby carried into engagement with the cutters 191, 197 if both of said cutters are used or with one of said cutters if only one is used, thereby causing the top to be severed at the desired point, the top being then free to drop from the reel as will be readily understood. When two cutters are used a short piece suitable for a setting will also be severed and dropped while the stalk continues its rearward passage. The tops of longer stalks will not be engaged by the reel until such tops pass out of engagement with the deflector 202 and related parts which, as described, are tilted upwardly and rearwardly so that, the longer the stalks or canes are, the nearer to the rearward end of the machine will they approach before the tops or the tops and settings are cut therefrom. The adjustability of all the parts of the machine, as hereinbefore fully described, enables the parts of the machine to be arranged in the most suitable and convenient position for successful operation as may be dictated by the condition of the crop and the precise manner in which it has been planted, which, as is well known, varies in different countries and localities.

The machine will, therefore, be adapted for harvesting cane successfully and without waste and also for cutting settings therefrom under all circumstances and conditions.

Having described the invention what I claim as new is:

1. In a machine of the class described, a frame structure comprising two side members and means whereby said side members are adjustably connected together, each side member being provided with a ground wheel and a steering wheel, and each side member having an independent superstructure; in combination with a frame bar, obliquely disposed and connected at its front end with the superstructure of one side member and at its rear end with the superstructure of the other side member of the frame.

2. In a machine of the class described, a frame structure including wheel supported side members, each having a superstructure including an upwardly and rearwardly inclined front member, sockets mounted on said front members, gathering arms having balls seated in the sockets and means for securing the gathering arms at various adjustments, said means including telescopic extension members, means for securing the same at various relative adjustments and ball and socket joints whereby the telescopic extension members are terminally connected with the gathering arms and the superstructure respectively.

3. In a machine of the class described, a frame structure including two wheel supported side members and means for connecting said side members in spaced relation, each side member having a superstructure including an upwardly and rearwardly tilted front member, slides supported on said front members, and means for adjusting the slides longitudinally of the front members, said slides having sockets formed therein, and gathering arms having balls engaging the sockets and means for securing the gathering arms at various adjustments relatively to the sockets and to the superstructure.

4. In a machine of the class described, a frame structure including side members connected together in spaced relation and each having a superstructure, slides mounted on the respective superstructures, rods supported for rotation, said rods extending through the slides and threadedly connected therewith, means for rotating the rods, gathering arms jointedly connected with the slides, sprocket wheels housed in the gathering arms, chains trained over the sprocket wheels and having prongs that extend through the housings and means including flexible shafts for driving the chains.

5. In a machine of the class described, a frame structure including wheel supported side members connected together in spaced relation, a bracket supported on each side member and having laterally extending upper and lower arms, bushings supported for rotation in the upper and lower arms, the upper bushing having a driving gear and the lower bushing having a hand wheel, said lower bushing being also internally threaded, an externally threaded sleeve engaging the lower bushing and a non-circular shaft extending through said sleeve and through the upper bushing, said shaft carrying a rotary cutter at its lower end, the hub of which abuts on the lower end of the sleeve and said shaft having a stop collar engaging the upper end of the sleeve.

6. In a machine of the class described, a frame structure including wheel supported side members connected together in spaced relation, a bracket supported on each side member and having laterally extending upper and lower arms, bushings supported for rotation in the upper and lower arms, the upper bushing having a driving gear and the lower bushing having a hand wheel, said lower bushing being also internally threaded, an externally threaded sleeve engaging the lower bushing and a non-circular shaft extending through said sleeve and through the upper bushing, said shaft carrying a rotary cutter at its lower end, the hub of which abuts on the lower end of the sleeve and said shaft having a stop collar engaging the upper end of the sleeve; in combination with means for driving the cutter carrying shaft through the medium of the driving gear.

7. In a machine of the class described, a frame structure including wheel supported side members adjustably connected together and spaced apart, each side member having a superstructure including forwardly tilted rear members and brace members, slides mounted for vertical adjustment on said rear members and brace members, secondary slides mounted for lateral adjustment on the vertically adjustable slides, shafts supporting the bearing members carried by the secondary slides, shafts supported in the bearing members and driven conveyer chains trained over the front and rear shafts supported on the superstructures of the respective side members of the frame.

8. In a machine of the class described, a frame structure including wheel supported side members adjustably connected together and spaced apart, each side member having a superstructure including forwardly tilted rear members and brace members, slides mounted for vertical adjustment on said rear members and brace members, secondary slides mounted for lateral adjustment on the vertically adjustable slides, shafts supporting the bearing members carried by the secondary slides, shafts supported in the bearing members and driven conveyer chains trained over the front and rear shafts supported on the superstructures of the respective side members of the frame, the shaft supporting bearing members including rods slidably associated with the secondary slides and springs whereby said rods are resiliently forced inwardly with respect to the frame structure.

9. In a machine of the class described, a frame structure including wheel supported spaced and adjustable side members, each having a superstructure, front and rear shafts carried by the respective superstructures, said shafts being vertically and laterally adjustable and spring projected in an inward direction, conveyer chains trained over said shafts and driving means for the same.

10. In a machine of the class described, a frame structure including spaced and adjustably connected side members, each having a superstructure, spring projected members carried by the superstructure, bearing members pivotally connected with the spring projected bearing members, shafts tiltably supported in the bearing members, conveyer chains trained over the shafts and means for driving the same.

11. In a machine of the class described, a frame structure including spaced and adjustably connected side members, each having a superstructure, spring projected members carried by the superstructure, bearing members pivotally connected with the spring projected bearing members, shafts tiltably supported in the bearing members, conveyer chains trained over the shafts and means for driving the same, the spring projected bearing members being mounted on the superstructures for vertical and lateral adjustment with respect thereto.

12. In a machine of the class described, a frame structure comprising spaced side members, each having a superstructure, front and rear forwardly inclined shafts carried by the respective superstructures, conveyer chains trained over the shafts and means for adjusting and for driving the conveyer chains, said chains being upwardly and rearwardly inclined; in combination with an obliquely disposed driven reel extending across the interspace between the side members, and cutting apparatus adjacent to the upgoing side of the reel.

13. In a machine of the class described, conveying means including pairs of spaced driven chains, the opposed inner stretches of which constitute the conveyers, in combination with a reel extending obliquely above and across the conveying means, means for driving the reel, and cutting apparatus disposed adjacent to the upgoing side of the reel.

14. In a machine of the class described, conveying means comprising pairs of driven endless chains, the inner opposed stretches of which coöperate to form the conveyer, in combination with a driven reel extending obliquely above and across the conveyer, means for supporting the front and rear ends of the reel adjacent to the opposite sides of the conveyer, and cutting apparatus extending adjacent to the lower portion of the upgoing side of the reel in substantially parallel relation to the axis of the reel.

15. In a machine of the class described, conveying means comprising pairs of driven endless chains, the inner opposed stretches of which coöperate to form the conveyer, in combination with a driven reel extending obliquely above and across the conveyer, means for supporting the front and rear ends of the reel adjacent to the opposite sides of the conveyer, cutting apparatus extending adjacent to the lower portion of the upgoing side of the reel in substantially parallel relation to the axis of the reel, and a deflector supported adjacent to the upper portion of the downgoing side of the conveyer.

16. In a machine of the class described, a frame structure including spaced side members, each having a superstructure, conveying means including co-acting driven chains carried by the respective superstructures, an obliquely disposed frame bar having its front end connected with the superstructure of one side member and its rear end connected with the superstructure of the other side member, an obliquely disposed reel carried by said frame bar, means for driving the reel and cutting apparatus supported adjacent to the lower portion of the upgoing side of the reel.

17. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with the superstructure of the other side member for vertical and lateral adjustment, a reel carried by the frame bar, means for driving the reel and cutting apparatus supported adjacent to the lower portion of the upgoing side of the reel.

18. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with a superstructure of the other side member for vertical and lateral adjustment, angular brackets carried by the frame bar, said brackets having horizontal slots, bearing members adjustable in said slots, a reel carrying shaft supported for rotation in the bearing members and means for driving said shaft.

19. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with the superstructure of the other side member for vertical and lateral adjustment, a driven reel adjustably supported by the frame bar and cutting apparatus supported adjacent to the lower portion of the upgoing side of the reel.

20. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with a superstructure of the other side member for vertical and lateral adjustment, a driven reel adjustably supported by the frame bar and cutting apparatus supported adjacent to the lower portion of the upgoing side of the reel; in combination with a deflector adjustably supported adjacent to the upper portion of the downgoing side of the reel.

21. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with the superstructure of the other side member for vertical and lateral adjustment, a driven reel adjustably supported by the frame bar and cutting apparatus supported adjacent to the lower portion of the upgoing side of the reel; in combination with means adjustably supported adjacent to the upper portion of the downgoing side of the reel, said means constituting a guide way whereby the top portions of the stalks will be deflected with respect to the reel, said reel and deflecting means being materially tilted in an upward and rearward direction whereby the stalks of increasing length will gradually become disengaged from the guide way and thrown in engagement with the reel.

22. In a machine of the class described, a frame structure including spaced side members, each having a superstructure, conveying means including co-acting driven chains carried by the respective superstructures, a frame bar extending obliquely across the frame structure, means for connecting the front end of the frame bar with the front end of the superstructure of one side member for vertical and lateral adjustment, means for connecting the rear end of the frame bar with the superstructure of the other side member for vertical and lateral adjustment, a driven reel adjustably supported by the frame bar and cutting apparatus supported adjacent to the lower portion of the upgoing side of the reel; in combination with a deflector adjustably supported adjacent to the upper portion of the downgoing side of the reel, and a guide rail supported in spaced and approximately parallel relation to the downgoing side of the rail.

23. In a machine of the class described, a frame structure including spaced side members, each having a superstructure, conveying means including driven chains carried by the respective superstructures, said chains having co-acting inner stretches for carrying stalks upwardly and rearwardly between the frame members and their superstructures, an obliquely disposed driven reel inclined upwardly and rearwardly with respect to the conveying means, cutting means co-acting with the reel and deflecting means adjacent to the downgoing side of the reel to hold the stalks from engagement with the reel for a given period according to the respective length of the stalks.

24. In a machine of the class described, a frame structure including spaced side members, each having a superstructure, conveying means including driven chains carried by the respective superstructures, said chains having co-acting inner stretches for carrying stalks upwardly and rearwardly between the frame members and their superstructures, an obliquely disposed driven reel inclined upwardly and rearwardly with respect to the conveying means, cutting means co-acting with the reel and deflecting means adjacent to the downgoing side of the reel to hold the stalks from engagement with the reel for a given period according to the respective length of the stalks; in combination with a driven auxiliary conveyer chain supported above the reel in an oblique position with respect to the frame structure.

25. In a machine of the class described, a frame structure including spaced side members, each having a superstructure, conveying means including driven chains carried by the respective superstructures, said chains having co-acting inner stretches for carrying stalks upwardly and rearwardly between the frame members and their superstructures, an obliquely disposed driven reel inclined upwardly and rearwardly with respect to the conveying means, cutting means co-acting with the reel and deflecting means adjacent to the downgoing side of the reel to hold the stalks from engagement with the reel for a given period according to the respective length of the stalks; in combination with a driven auxiliary conveyer chain supported above the reel in an oblique position with respect to the frame structure, said auxiliary conveyer chain having prongs that project beyond the deflecting means adjacent to the reel.

In testimony whereof I affix my signature.

RUDOLPH A. MAYER.